(12) United States Patent
Yeh et al.

(10) Patent No.: US 6,917,843 B2
(45) Date of Patent: Jul. 12, 2005

(54) SYSTEM AND METHOD FOR SCHEDULING PRODUCTION OF MOLDS

(75) Inventors: Pu-Yang Yeh, Tu-chen (TW); XuLiang Guo, Shenzhen (CN); Zhun Xiao, Shenzhen (CN)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 0 days.

(21) Appl. No.: 10/812,819

(22) Filed: Mar. 29, 2004

(65) Prior Publication Data

US 2004/0193299 A1 Sep. 30, 2004

(30) Foreign Application Priority Data

Mar. 28, 2003 (TW) ........................................ 92107189 A

(51) Int. Cl.⁷ .............................................. G06F 19/00
(52) U.S. Cl. ........................ 700/100; 700/97; 700/107
(58) Field of Search ............................. 700/95, 97, 99, 700/100, 101, 106, 107, 197, 201; 703/1

(56) References Cited

U.S. PATENT DOCUMENTS

| | | | |
|---|---|---|---|
| 5,233,533 A | | 8/1993 | Edstrom et al. |
| 5,285,392 A | * | 2/1994 | Kyle et al. ................... 700/100 |
| 5,787,000 A | * | 7/1998 | Lilly et al. ................... 700/100 |
| 6,131,093 A | | 10/2000 | Maruyama et al. |
| 6,675,055 B1 | * | 1/2004 | Fischer ......................... 700/97 |
| 2003/0004595 A1 | * | 1/2003 | Seimiya et al. ............. 700/100 |

* cited by examiner

Primary Examiner—Leo Picard
Assistant Examiner—Charles Kasenge
(74) Attorney, Agent, or Firm—Wei Te Chung

(57) ABSTRACT

A system for mold production scheduling includes a mold production scheduling server (1), and terminal computers connected to the mold production scheduling server via a network (6). The terminal computers include a supply computer (2), a client computer (3), a maintaining computer (4), and a production line computer (5). The mold production scheduling server includes a basic data maintaining module (10) and a simulation analysis module (20). The basic data maintaining module is for adding, modifying, inquiring of and deleting various basic data. The simulation analysis module dynamically analyzes supply and demand, and generates scheduling results according to basic data provided by the basic data maintaining module. A related mold production scheduling method is also provided.

14 Claims, 4 Drawing Sheets

SYSTEM AND METHOD FOR SCHEDULING PRODUCTION OF MOLDS

BACKGROUND OF THE INVENTION

1. Field of the Invention

The present invention relates to a system and method for scheduling production in a manufacturing enterprise, and especially to an automated system and method for scheduling production of molds.

2. Background of the Invention

Conventionally, the mold production management software used in a mold production enterprise only allows users to search basic data and production status. Normally, the scheduling of operations is handled by expert technicians. Different technicians are responsible for the scheduling of different processes. The technicians are not necessarily familiar with and do not control all the conditions of mold production, and the scheduling may therefore be improper and prone to error. In particular, delays can frequently occur when a needed machine remains occupied performing other work, or when a needed complementary part of the mold is still in process. This not only decreases the speed of mold production, but can also lead to wasting of resources. Reduced efficiency inevitably translates into increased costs.

There is no known system or method for mold production scheduling which can systematically deal with an order for a mold according to detailed data on factors such as the relative importance of and relationships between parts of the mold, machine loads, and key machines.

SUMMARY OF THE INVENTION

Accordingly, a main objective of the present invention is to provide a mold production scheduling system and method which can automatically schedule production and illustrate a distribution of a part order among relevant machines by way of a Gunter analysis graph, according to data on occupation times of machines, bills of material (BOMs), delivery dates for each of parts of a mold, and man-hours of workshop sections.

To accomplish the above objective, a system for mold production scheduling in accordance with a preferred embodiment of the present invention comprises a mold production scheduling server, and terminal computers connected to the mold production scheduling server via a network. The terminal computers comprises a supply computer, a client computer, a maintaining computer, and a production line computer. The supply computer provides an interactive user interface for users to input basic data on available machines. The basic data includes types, quantities and service times of machines. The client computer is for inputting data on client demand, and for setting basic production data on molds to be produced. The basic production data include bills of material (BOMs), delivery dates production orders for each part of each mold, and man-hours of corresponding workshop sections. The maintaining computer is for updating a record of finished parts every day. Data input via the terminal computers are transmitted to the mold production scheduling server via the network. The mold production scheduling server comprises a plurality of function modules, which are for scheduling mold production and transmitting production schedules to the production line computer via the network.

Further, the present invention provides a preferred mold production scheduling method, comprising the steps of: (a) generating a mold part bill according to a client's demand and a mold bill of material; (b) calculating a planned finish date of each mold part; (c) calculating a load of each of machines and determining key machines; (d) determining key mold parts and key production orders; (e) scheduling key production orders for key machines; (f) determining whether any ordinary production order is ahead of any key production order; (g) if any ordinary production order is ahead of a key production order, scheduling the ordinary production order applying a pull rule; (h) if no ordinary production order is ahead of any key production order, scheduling each ordinary production order applying a push rule; (i) generating an production order scheduling result; and (j) describing the production order scheduling result by way of a Gunter analysis graph, in order to display occupation times of each mold part on corresponding machines.

Other objects, advantages and novel features of the present invention will be drawn from the following detailed description of the preferred embodiment and preferred method of the present invention with the attached drawings, in which:

DETAILED DESCRIPTION OF THE INVENTION

In production of a mold, a plurality of machines is required. A so-called "load" of each machine can be calculated according to the service time required of that machine. Each machine is defined herein as a key machine or an ordinary machine, according to its load. A machine with a large load is a key machine; otherwise, the machine is an ordinary machine. Production of each part of a mold requires a plurality of production orders input to the machines. A production order processed on a key machine is a key production order; otherwise, the production order is an ordinary production order. Each mold may be divided into several parts. A mold part having a key order is a key part; otherwise, the mold part is an ordinary part. In the following description, unless the context indicates otherwise, a reference to a "part" is a reference to a mold part.

Figure 1:
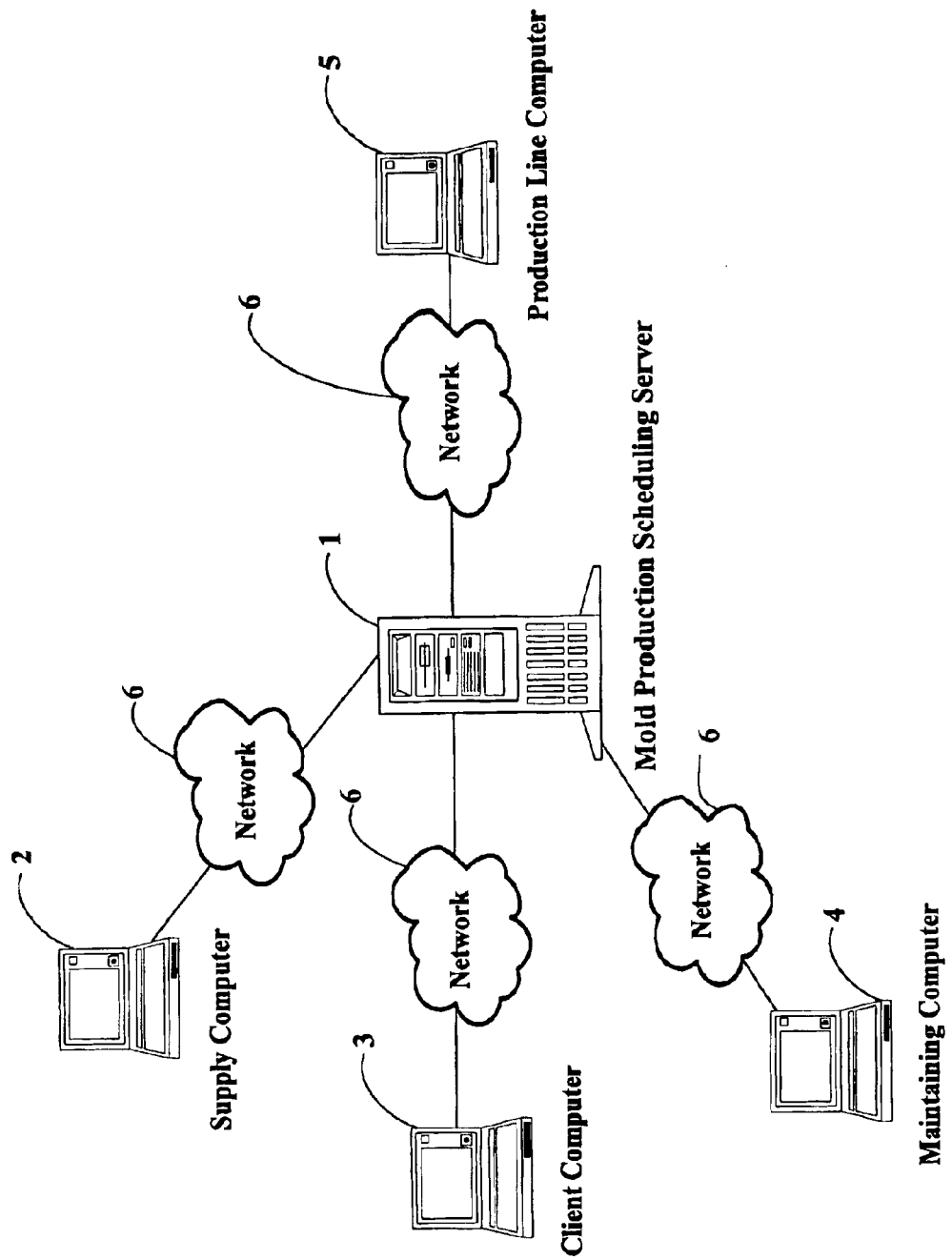
FIG. 1 is a schematic diagram of hardware configuration of a system for mold production scheduling in accordance with the preferred embodiment of the present invention.

FIG. 1 is a schematic diagram of hardware configuration of a mold production scheduling system in accordance with the preferred embodiment of the present invention. The system comprises a mold production scheduling server 1, and terminal computers connected to the mold production scheduling server 1 via a network 6. The terminal computers comprise a supply computer 2, a client computer 3, a maintaining computer 4, and a production line computer 5. The network 6 may be an intranet, the Internet, or any other suitable type of communications network. The terminal computers may operate in a software environment such as Windows 95, Windows 98, or Windows NT. The supply computer 2 provides an interactive user interface for users to input basic data on available machines. The basic data includes types, quantities and available service times of machines. The client computer 3 is for inputting data on client demand, and for setting basic production data on molds to be produced. The basic production data include bills of material (BOMs), delivery dates, production orders for each part of each mold, and man-hours of corresponding workshop sections. The man-hours of each workshop section are the production time needed for one or more parts in that workshop section. The maintaining computer 4 is for updating a record of finished parts every day. Finished parts are removed from the relevant production schedule. Data input via the terminal computers are transmitted to the mold production scheduling server 1 via the network 6. The mold production scheduling server 1 comprises a plurality of function modules, which are for scheduling mold production and transmitting production schedules to the production line computer 5 via the network 6.

Figure 2:
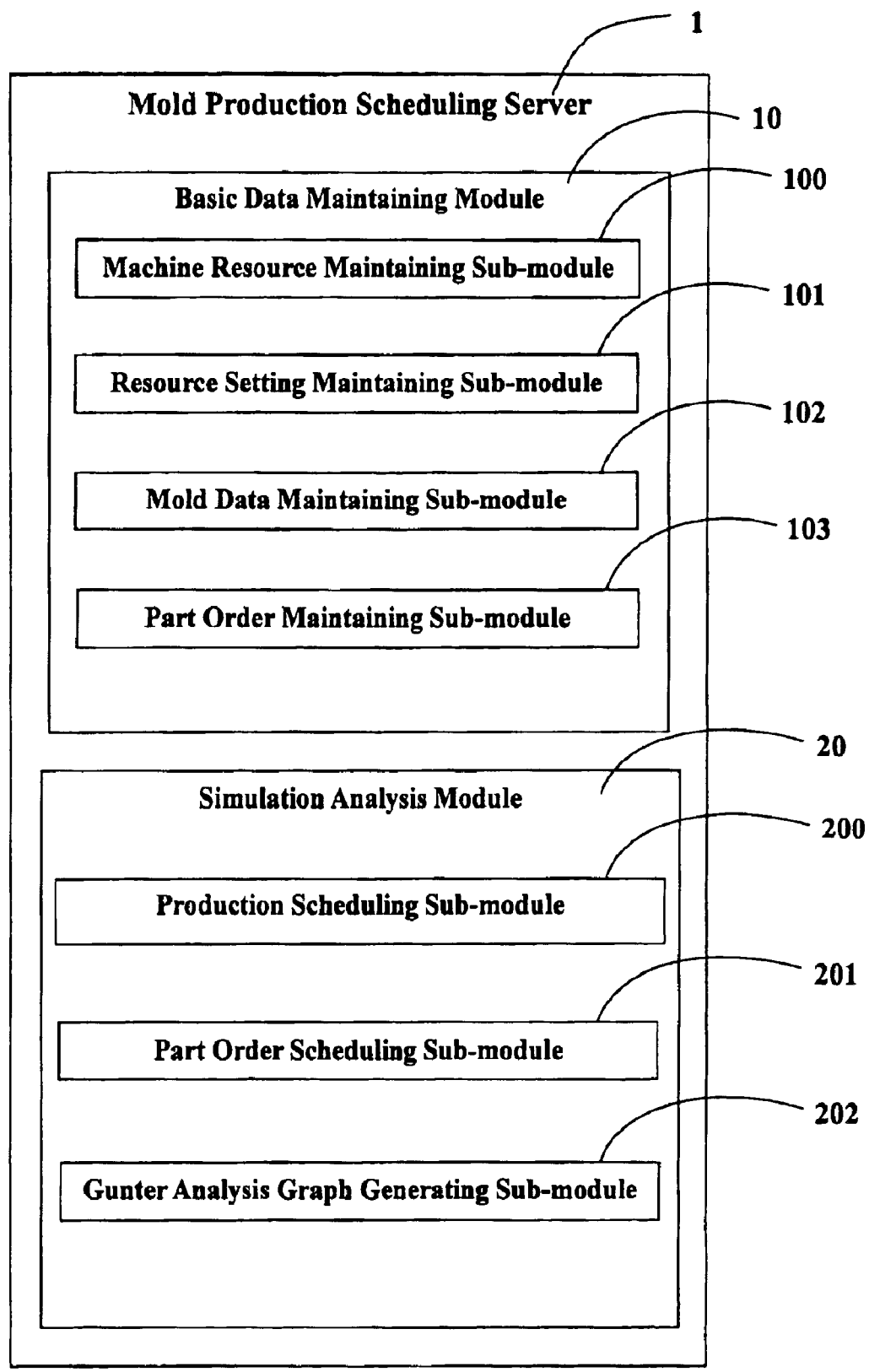
FIG. 2 is a schematic diagram showing main function modules of a mold production scheduling server of the system of FIG. 1.

FIG. 2 is a block diagram showing main function modules of the mold production scheduling server 1. The mold production scheduling server 1 comprises a basic data maintaining module 10, and a simulation analysis module 20.

The basic data maintaining module 10 is for adding, modifying, inquiring of and deleting various basic data. The basic data maintaining module 10 comprises a machine resource maintaining sub-module 100, a resource setting maintaining sub-module 101, a mold data maintaining sub-module 102, and a part order maintaining sub-module 103. The machine resource maintaining sub-module 100 is for adding, modifying, inquiring of and deleting basic data on available machines, and for setting users and use times according to codes, names, quantities and service times of available machines. The resource setting maintaining sub-module 101 is for setting a status of any machine as occupied, and setting a time period during which the machine will remain occupied. The mold data maintaining sub-module 102 is used for adding, modifying and deleting basic mold data, and for generating a mold parts bill. The basic mold data include a BOM (bill of material), a delivery date and production orders for each part of a mold, and man-hours of the relevant workshop sections. The part order maintaining sub-module 103 is used for adding, modifying and deleting part order data. The part order data for each part includes a part serial number, a delivery date, workshop sections, scheduled man-hours, and a production status of each relevant workshop section. The part serial number is a number of a part in a mold. The delivery date of the part is related to the delivery date of the mold. The production status of each workshop section includes not started, WIP (work in progress), and finished.

The simulation analysis module 20 dynamically analyzes supply and demand, and generates scheduling results according to basic data provided by the basic data maintaining module 10. The basic data is related to the available machine resources and client demand. The simulation analysis module 20 comprises a production scheduling sub-module 200, a part order scheduling sub-module 201, and a Gunter analysis graph generating sub-module 202. The production scheduling sub-module 200 is for setting start times and finish times for parts to be produced. The part order scheduling sub-module 201 is for generating part order scheduling charts. The Gunter analysis graph generating sub-module 202 transforms the part order scheduling charts into Gunter analysis graphs, which illustrate a distribution of part orders among various machines.

Figure 3:
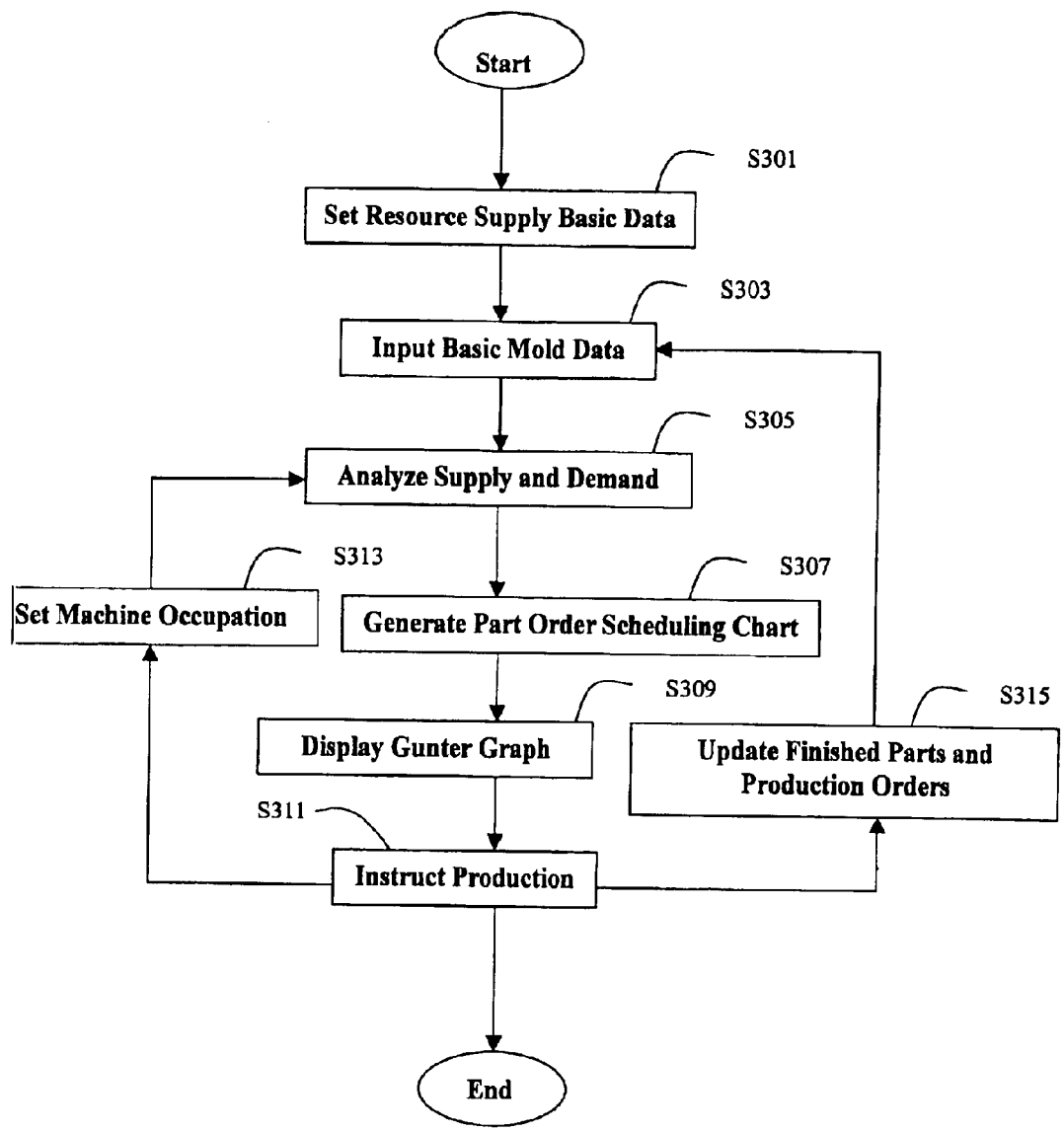
FIG. 3 is a flowchart for implementing the mold production scheduling system of the present invention.

FIG. 3 is a flowchart of a preferred method for implementing the mold production scheduling system of the present invention. In step S301, the machine resource maintaining sub-module 100 sets resource supply basic data. The resource supply basic data include available machine resources, workers, and work teams. The available machine resources include types, quantities and available service times of machines. In step S303, the mold data maintaining sub-module 102 inputs basic mold data according to a client's demand via the client computer 3. The basic mold data includes a BOM, a delivery date and production orders for each part of the relevant mold, and man-hours of relevant workshop sections. In step S305, the production scheduling sub-module 200 analyzes supply and demand according to the resource supply basic data and basic mold data. The production scheduling sub-module 200 then schedules mold parts to be produced and calculates start times and finish times for parts which are not yet scheduled, all according to the basic data on available resources and the client's demand. In step S307, the part order scheduling sub-module 201 generates a part order scheduling chart. The part order scheduling chart includes details of handling of all part orders during the period of time needed for production of all the parts. In step S309, the Gunter analysis graph generating sub-module 202 transforms the part order scheduling chart into a Gunter analysis graph, which illustrates a distribution of the part orders among relevant machines. In step S311, the mold production scheduling server 1 transmits a mold production schedule to the production line computer 5 through the network 6 to instruct production. The mold production schedule is based on the part order scheduling chart and the Gunter analysis graph. In step S313, the resource setting maintaining sub-module 101 sets statuses of relevant machines as occupied, and sets times during which the machines will remain occupied. Generally, the resource supply basic data need not change during subsequent production. Thereupon the procedure goes back to step S305 for dynamic analysis of supply and demand for producing WIP parts. In step S315, after completing each day's production, the part order maintaining sub-module 103 dynamically updates finished parts and outstanding production orders. The maintaining computer 4 updates the record of finished parts. The just-finished parts are removed from the mold production schedule, and the procedure goes back to the step S303 for inputting of new basic mold data.

Figure 4:
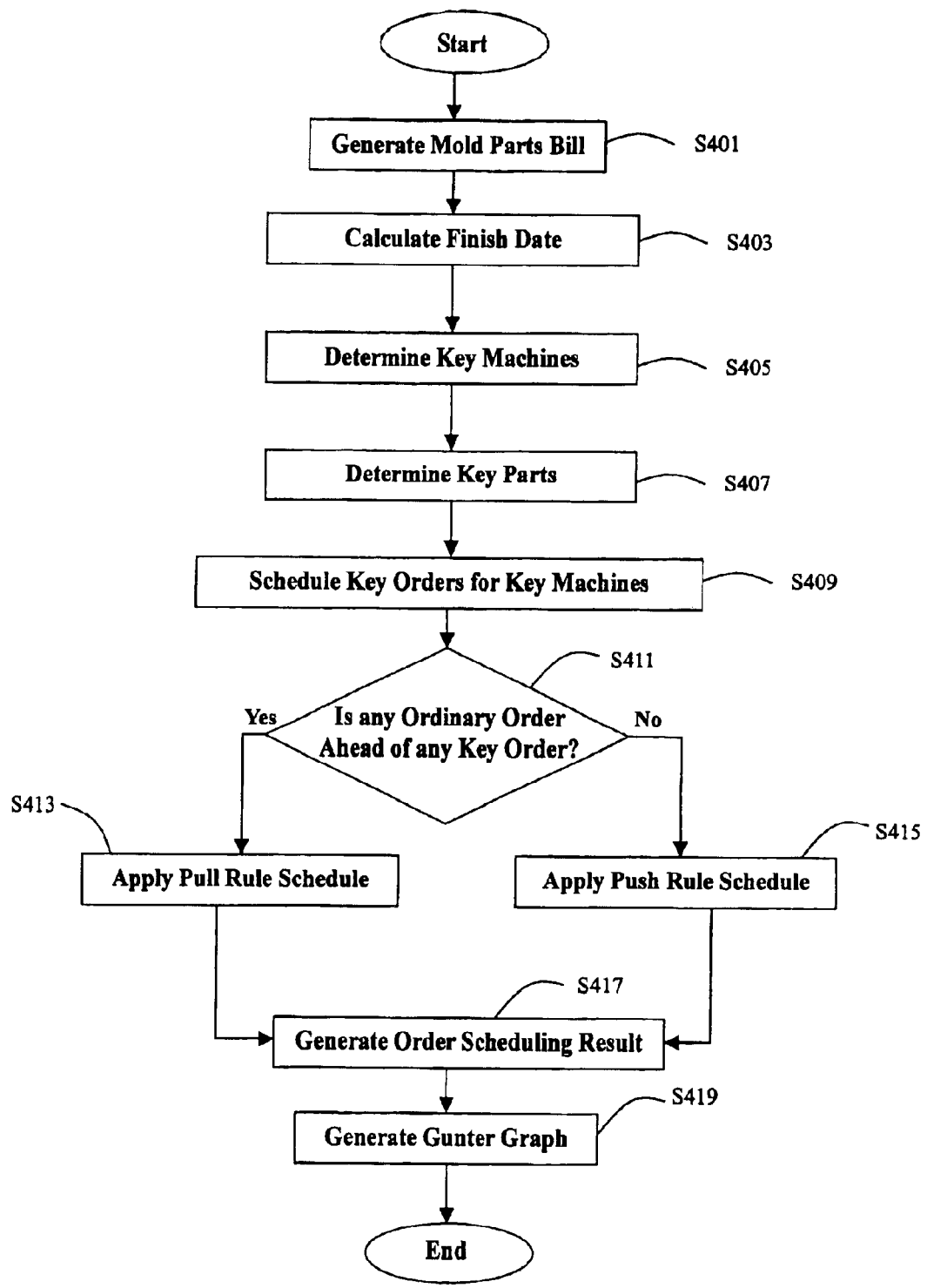
FIG. 4 is a flowchart of details of two steps shown in FIG. 3.

FIG. 4 is a flowchart of details of steps S307 and S309 of FIG. 3, namely generating a part order scheduling chart and displaying a Gunter analysis graph, according to the present invention. In step S401, the mold data maintaining sub-module 102 generates a mold part bill according to the client's demand and a mold BOM. The mold part bill includes all parts of a mold demanded by the client. In step S403, the part order maintaining sub-module 103 calculates a planned finish date and lead time of each part. In step S405, the production scheduling sub-module 200 calculates a load of each machine, and determines which machines are key machines. In step S407, the production scheduling sub-module 200 determines key parts. In step S409, the production scheduling sub-module 200 determines key production orders, and applies a limited capacity project method to schedule key production orders for key machines. A quantity, capacity and efficiency of each kind of machine, and a capacity and work time of each of corresponding workers are all taken into account in the limited capacity project method. In step S411, the part order scheduling sub-module 201 determines whether any ordinary production order is ahead of any key production order. If any ordinary production order is ahead of a key production order, in step S413, the part order scheduling sub-module 201 applies a pull rule schedule for the ordinary production order. That is, the scheduling of the ordinary production order ahead of the key production order is reversed, whereupon the procedure goes to step S417 described below. If no ordinary production order is ahead of a key production order, in step S415, the part order scheduling sub-module 201 applies a push rule schedule for each ordinary production order. The ordinary production order is scheduled in turn behind the corresponding one or more key production orders. If the finish date of any part is later than the planned date for that part, the part order maintaining sub-module 103 modifies the corresponding production orders on the corresponding key machines so that the finish date is no later than the planned date. In step S417, the part order scheduling sub-module 201 generates a part order scheduling chart. In step S419, the Gunter analysis graph generating sub-module 202 transforms the part order scheduling chart into the Gunter analysis graph, which illustrates the distribution of the part orders among the relevant machines.

Although the present invention has been specifically described on the basis of a preferred embodiment and a preferred method, the invention is not to be construed as being limited thereto. Various changes or modifications may be made to said embodiment and method without departing from the scope and spirit of the invention.

What is claimed is:

1. A mold production scheduling system for scheduling mold parts to be produced, the mold production scheduling system comprising:
   a basic data maintaining module for adding, modifying, inquiring of and deleting basic data, the basic data including machine resource data, mold data and mold part data; and
   a simulation analysis module for dynamically analyzing supply and demand, and generating scheduling results according to basic data provided by the basic data maintaining module, the simulation analysis module comprising:
   a production scheduling sub-module for scheduling start times and finish times for mold parts to be produced;
   a part order scheduling sub-module for generating mold part order scheduling charts; and
   a Gunter analysis graph generating sub-module for transforming the mold part order scheduling charts into Gunter analysis graphs, which illustrate a distribution of each part order in corresponding machines.

2. The mold production scheduling system according to claim 1, wherein the basic data maintaining module comprises:
   a machine resource maintaining sub-module for maintaining basic data on available machine resources according to codes, names, quantities and service times of available machines;
   a resource setting maintaining sub-module for setting a status of any machine as occupied, and for setting a time period during which the machine will remain occupied;
   a mold data maintaining sub-module for adding, modifying and deleting mold data, and for generating mold parts bills; and
   a part order maintaining sub-module for adding, modifying and deleting part order data.

3. The mold production scheduling system according to claim 2, wherein the machine resource maintaining sub-module is also for setting users and use times according to the codes, names, quantities and service times of available machines.

4. The mold production scheduling system according to claim 2, wherein the basic data comprise a bill of material, a delivery date and a production order on each part of a mold, and man-hours of relevant workshop sections.

5. The mold production scheduling system according to claim 2, wherein the part order data for each part comprise a serial number, a delivery date, one or more workshop sections, scheduled man-hours, and a production status of each relevant workshop section.

6. The mold production scheduling system according to claim 1, wherein the production scheduling sub-module is also for calculating loads of machines and determining key machines.

7. A mold production scheduling method for scheduling mold parts to be produced, the method comprising the steps of:
   generating a mold part bill according to a client's demand and a mold bill of material;
   calculating a planned finish date of each mold part;
   calculating a load of each of machines, and determining key machines;
   determining key mold parts and key production orders;
   scheduling key production orders for key machines;
   determining whether any ordinary production order is ahead of any key production order;
   if any ordinary production order is ahead of a key production order, scheduling the ordinary production order applying a pull rule;
   if no ordinary production order is ahead of any production key order, scheduling each ordinary production order applying a push rule;
   generating a production order scheduling result; and
   describing the production order scheduling result by way of a Gunter analysis graph, in order to display occupation times of each mold part on corresponding machines.

8. The mold production scheduling method according to claim 7, wherein the step of determining key machines comprises defining a machine with a large load as a key machine.

9. The mold production scheduling method according to claim 7, wherein the step of determining key production orders comprises defining production orders processed on key machines as key production orders.

10. The mold production scheduling method according to claim 7, wherein the step of determining key mold parts comprises defining mold parts with key production orders as key mold parts.

11. The mold production scheduling method according to claim 7, wherein the step of scheduling key production orders for key machines comprises applying a limited capacity project method, in which a quantity, capacity and efficiency of each kind of machine, and a capacity and work time of corresponding workers are all taken into account.

12. The mold production scheduling method according to claim 7, wherein the step of scheduling the ordinary production order applying a pull rule comprises reversing any scheduling of the ordinary production orders ahead of the key production order.

13. The mold production scheduling method according to claim 7, wherein the step of scheduling each ordinary production order applying a push rule comprises scheduling each ordinary production order behind the corresponding one or more key production orders.

14. A process of mold production scheduling, comprising the steps of:
   setting resource supply basic data;
   inputting basic mold data;
   analyzing supply and demand;
   generating a part order scheduling chart;
   displaying a Gunter graph; and
   instructing production, including setting machine occupation and returning to the step of analyzing supply and demand, and updating finished parts and production orders and returning to the step of inputting basic mold data.

* * * * *